Feb. 16, 1926.

J. P. ROSS

EDUCATIONAL DEVICE

Filed August 1, 1924

1,573,358

J. P. Ross, Inventor

By C. A. Snow & Co.

Attorneys

Patented Feb. 16, 1926.

1,573,358

UNITED STATES PATENT OFFICE.

JOSEPH P. ROSS, OF WINONA, MINNESOTA.

EDUCATIONAL DEVICE.

Application filed August 1, 1924. Serial No. 729,591.

*To all whom it may concern:*

Be it known that I, JOSEPH P. Ross, a citizen of the United States, residing at Winona, in the county of Winona and State of Minnesota, have invented a new and useful Educational Device, of which the following is a specification.

This invention relates to puzzles and toys. the primary object of the invention being to provide a toy which will not only be exceptionally amusing to operate but one which will have educational advantages.

An important object of the invention is to provide a device of this kind which may be readily and easily operated and the principles of the device comprehended by children.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
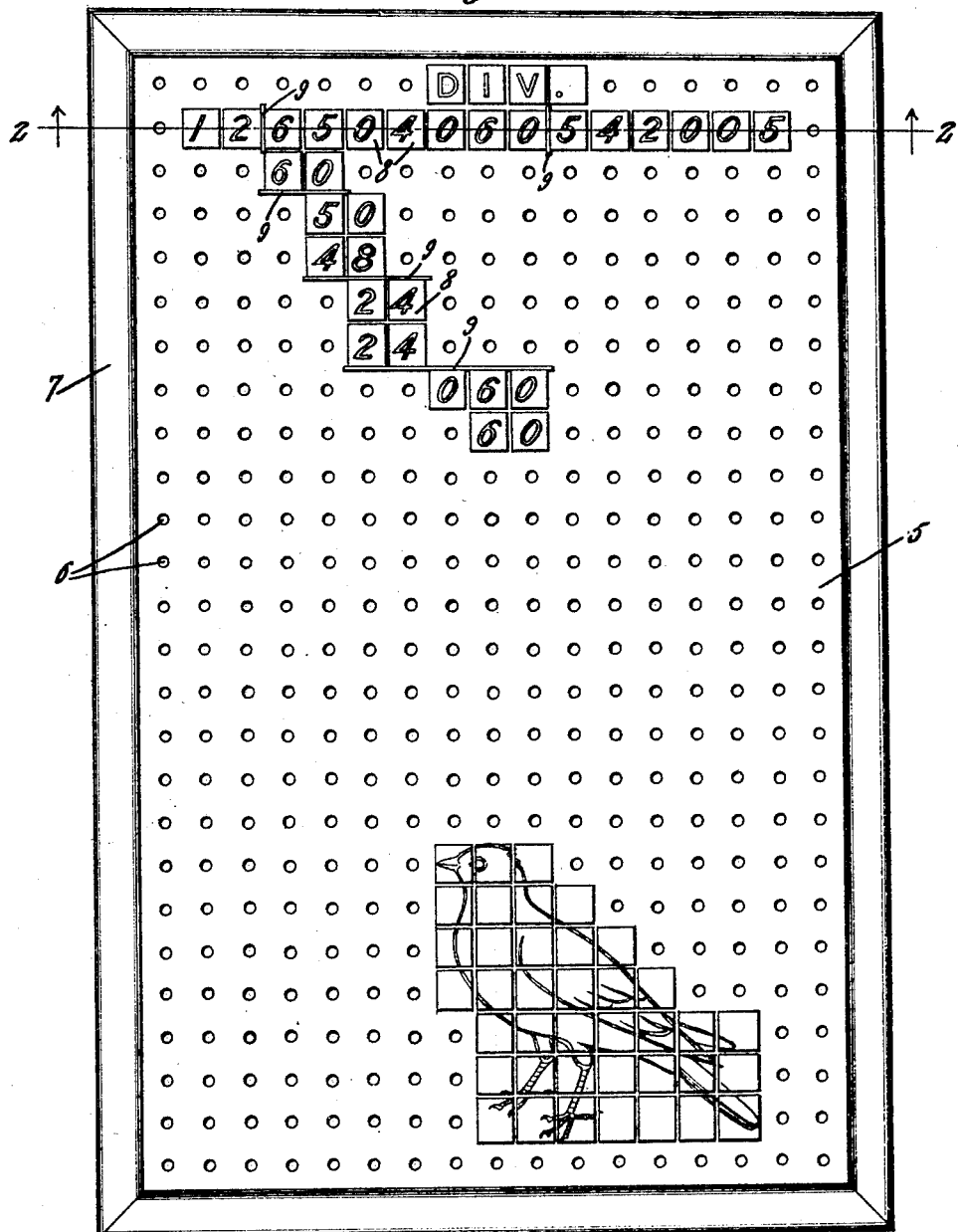
Figure 1 is a plan view of a device constructed in accordance with the invention.
Figure 2:
Figure 2 is a sectional view taken on line 2—2 of Figure 1.

Referring to the drawing in detail, the reference character 5 designates the base or body of the device, which may be constructed of any suitable material and formed with a plurality of parallel rows of openings 6.

The base or body 5 is supported in a frame indicated at 7, which frame is formed with grooves to receive the edges of the member 5, providing a means for supporting the member 5 in spaced relation with the surface on which the same is positioned.

Associated with the base 5 are indicating members 8 which are preferably square in formation and of such sizes that when two or more of these members are placed adjacent to each other, spaces will be formed therebetween to accommodate dividing strips indicated at 9 which may be colored to cause the dividing member to stand out among the indicating members.

Formed integral with each indicating member is a peg 10 which pegs are designed to fit in the opening of the member 5 whereby the indicating members may be secured in predetermined positions by the person manipulating the device.

As clearly shown by Figure 1 of the drawing, the device may be employed for working out mathematical problems, there being a problem in division illustrated by Figure 1 of the drawing, the dividing members acting as the usual division lines simulating lines drawn manually.

While the device may be employed for illustrating mathematical problems, it is also contemplated to employ the member 5 as a base for puzzles, and to this end the indicating members instead of having figures or letters formed thereon, may be provided with lines which, when moved into proper relation with respect to each other will form the outline of objects or birds, animals or the like, providing an exceptionally interesting puzzle.

From the foregoing detailed description of the device, it is believed that a further description of the use of the device is unnecessary.

I claim:—

In a device of the character described, a base having a plurality of spaced openings formed therein, indicating members having pegs, said pegs adapted to be positioned in the openings to secure the indicating members in position on the base, said indicating members being of sizes to provide spaces between adjacent indicating members, dividing strips adapted to be positioned within spaces formed between indicating members, said dividing strips adapted to be held by frictional contact with the indicating members.

In testimony that I claim the foregoing as my own, I have hereto affixed my signature.

JOSEPH P. ROSS.